United States Patent [19]

Suzuki et al.

[11] Patent Number: 5,866,667

[45] Date of Patent: Feb. 2, 1999

[54] METHOD OF PRODUCING CLEANING BLADE AND COMPOSITION EMPLOYED THEREIN

[75] Inventors: Satoshi Suzuki; Hiroyuki Mori, both of Aichi, Japan

[73] Assignee: Tokai Rubber Industries, Ltd., Komaki, Japan

[21] Appl. No.: 800,425

[22] Filed: Feb. 14, 1997

[30] Foreign Application Priority Data

Feb. 15, 1996 [JP] Japan .................................... 8-027913

[51] Int. Cl.$^6$ .................................................. C08G 18/10
[52] U.S. Cl. ........................... 528/52; 528/53; 428/423.1
[58] Field of Search ........................... 428/423.1; 528/52, 528/53

[56] References Cited

U.S. PATENT DOCUMENTS 4,395,530  7/1983  Hammond ................................. 528/48
5,080,976  1/1992  Yanai et al. .......................... 428/423.1

*Primary Examiner*—Rachel Gorr
*Attorney, Agent, or Firm*—Armstrong, Westerman, Hattori, McLeland & Naughton

[57] ABSTRACT

A method of producing a cleaning blade comprising steps of filling the cavity of a mold with a liquid composition containing prepolymer for forming urethane rubber, a curing agent and quaternary ammonium salt represented as the following general formula (1) as a catalyst, curing the composition, and unmolding the cured matter and a composition employed therein.

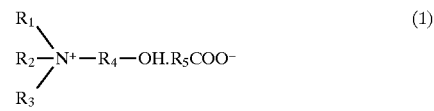

wherein $R_{1,2,3}$ means $-C_nH_{2n+1}$ wherein n represents 0 or a positive integer, $R_4$ means $-C_nH_{2n}$ wherein n represents a positive integer and $R_5$ means $-C_nH_{2n+1}$, wherein n represents 0 or a positive integer, or $-CH_2-CN$.

For this reason, it does not take a long time for curing a liquid composition, unlike the prior methods, resulting in improvement in product efficiency. Furthermore, since the pot life of the liquid composition is long, fluidity is good and no defective products may not be caused.

4 Claims, 4 Drawing Sheets

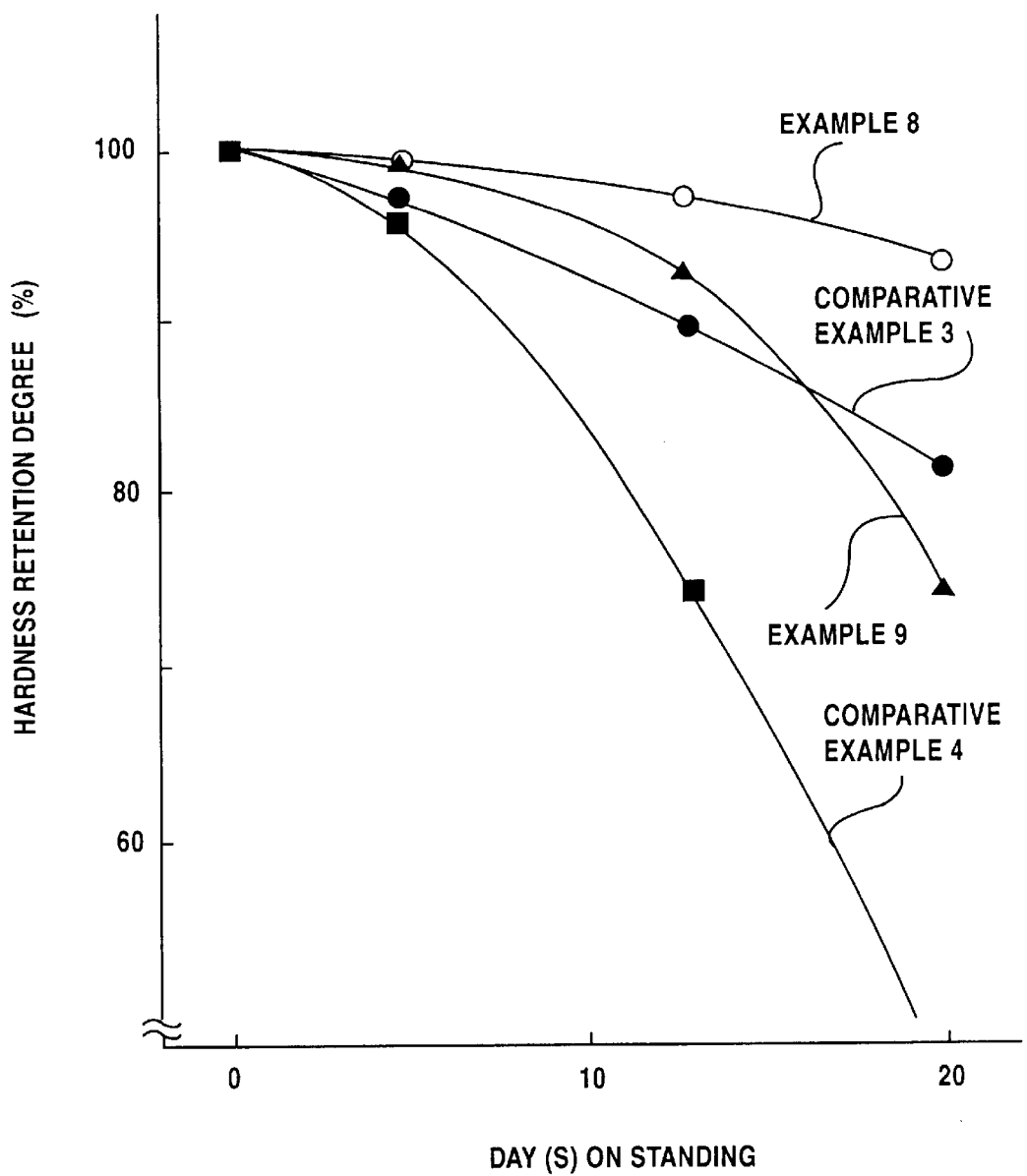

METHOD OF PRODUCING CLEANING BLADE AND COMPOSITION EMPLOYED THEREIN

FIELD OF THE INVENTION

The present invention relates to a method of producing a cleaning blade for removing toner left on a peripheral surface of a photosensitive drum of an electrophotographic printer and the like, and a composition employed therein.

BACKGROUND OF THE INVENTION

It is a general method of photocopying with an electrophotographic printer that a peripheral surface of a photosensitive drum is uniformly charged, the peripheral surface is exposed by the copied image of a subject so as to form an electrostatic latent image on the peripheral surface, toner is attached to the electrostatic latent image so as to form a toner image, and the toner image is copied on a sheet of paper and the like.

In such an electrophotographic printer, toner remains on the peripheral surface of a photosensitive drum after the toner image is copied and is generally removed by scraping with a cleaning blade 1 having a holding plate 2 as shown in FIG. 1.

As an elastic body employed for the cleaning blade 1, urethane rubber is prevalently used for its superior dynamical properties such as abrasion resistance. The cleaning blade 1 made of urethane rubber is produced, for example, by a prepolymer method comprising steps of providing a mold having a cavity for forming the cleaning blade, filling the cavity of the mold with a liquid composition containing prepolymer wherein polyisocyanate and polyol are partially polymerized (hereinafter referred to 'urethane-rubber-forming prepolymer'), a curing agent and a catalyst, curing the composition and unmolding thus obtained cured matter.

However, it takes time in the above method to fill the cavity of the mold with a liquid composition and cure thereof, resulting in bad product efficiency. Even if the amount of a catalyst in the liquid composition is increased for shortening an unmolding time with intention to improve product efficiency, the liquid composition cannot spread uniformly through the mold because a curing reaction of the liquid composition rapidly progresses so that the viscosity thereof increases as the catalyst increases in amount, resulting in increase in the number of defects due to insufficient fluidity in case that triethylenediamine (TEDA), dimethylimidazole (DMIZ) or the like, prevalently used heretofore, is adopted as a catalyst. Further, since the liquid composition containing urethane residue cured in a mixing chamber of a casting machine is cast into the mold, cleaning properties of thus obtained product may be deteriorated. For this reason, it is a current situation that product efficiency can not be improved by increasing the amount of the catalyst. In addition, there is another problem that a large-sized molding can not be obtained because of low fluidity.

SUMMARY OF THE INVENTION

Accordingly, it is an object of the present invention to provide a method of producing a cleaning blade efficiently by employing the above prepolymer method and a composition employed therein.

In a first aspect, the present invention provides a method of producing a cleaning blade comprising steps of providing a mold having a cavity for forming the cleaning blade, filling the cavity of the mold with a liquid composition containing urethane-rubber-forming prepolymer, a curing agent and a catalyst, curing the composition and unmolding the cured matter, wherein the catalyst is quaternary ammonium salt represented as the following general formula (1).

wherein $R_{1,2,3}$ means $-C_nH_{2n+1}$ wherein n represents 0 or a positive integer, $R_4$ means $-C_nH_{2n}$ wherein n represents a positive integer and $R_5$ means $-C_nH_{2n+1}$, wherein n represents 0 or a positive integer, or $-CH_2-CN$.

In a second aspect, the present invention provides a liquid composition containing urethane-rubber-forming prepolymer, a curing agent and a catalyst, wherein the catalyst is quaternary ammonium salt represented as the following general formula (1).

wherein $R_{1,2,3}$ means $-C_nH_{2n+1}$ wherein n represents 0 or a positive integer, $R_4$ means $-C_nH_{2n}$ wherein n represents a positive integer and $R_5$ means $-C_nH_{2n+1}$, wherein n represents 0 or a positive integer, or $-CH_2-CN$.

Namely, the inventors have piled up various studies on the catalyst employed for producing urethane rubber. As a result, they found out that when a cleaning blade made of urethane rubber is produced by using the quaternary ammonium salt represented as the above general formula (1) as a catalyst, the liquid can be filled into the cavity of a mold satisfactorily because the quaternary ammonium salt is higher in heat sensitivity compared with a conventional general catalyst and hardly shows activity, which means that liquid viscosity does not increase, until a certain temperature. Further, they found out that when the liquid temperature becomes higher than a certain temperature after completion of casting into a mold, a curing reaction rapidly progresses, resulting in drastic improvement in product efficiency as a whole, because the activity of quaternary ammonium salt is higher than that of a conventional general catalyst. Thus, they reached the present invention.

Besides, when a polyisocyanate-polybutylene adipate polymer is employed as the urethane-rubber-forming prepolymer, the hardness of thus obtained cleaning blade can be maintained over a long period because the hydrolysis resistance thereof improves further.

In addition, when the content of the catalyst is set within a range of 0.002 to 0.03% by weight based on the whole composition in case that the quaternary ammonium salt is employed as a catalyst solely or in combination with other catalyst(s), especially superior product efficiency can be obtained.

SUMMARY OF THE INVENTION

Now, the present invention will be described in detail.

First any mold can be acceptable for the present invention if it has been employed fox producing a cleaning blade heretofore.

Next, the liquid composition filled into the cavity of the mold for forming the cleaning blade in the present invention contains urethane-rubber-forming prepolymer, a curing agent and a catalyst.

The prepolymer for forming the urethane rubber can be obtained by partially polymerizing polyisocyanate and polyol.

As polyisocyanate, for example, there are 4,4'-diphenylmethane diisocyanate (MDI), isophorone diisocyanate (IPDI), 4,4'-dicyclohexylmethane diisocyanate (hydrogenated MDI), trimethylhexamethylene diisocyanate (TMHDI), tolylene diisocyanate (TDI), carbodidmide-modified MDI, polymethylene phenyl polyisocyanate (PAPI), orthotoluidiene diisocyanate (TODI), naphthylene-diisocyanate (NDI), xylene diisocyanate (XDI), hexamethylene diisocyanate (HMDI), para-phenylene diisocyanate (PDI), lysine diisocyanaate methyl ester (LDI), dimethyl diisocyanate (DDI) and the like. Among all, it is preferable to employ MDI, TODI or the like.

In the meantime, as the polyol employed with the above polyisocyanate, for example, there are polyester polyols such as polyethylene adipate (PEA), polybutylene adipate (PBA), polyhexylene adipate, a copolymer of ethylene adipate and butylene adipate, polycaprolactone, polyether polyol such as polyoxytetramethylene glycol, polyoxypropylene glycol and the like. Among all, it is preferable to employ those which have a molecular weight of 1,500 to 3,000. That is, those polyols which have a molecular weight less than 1,500 show a tendency that thus obtained urethane rubber deteriorates in physical properties, while those which have a molecular weight over 3,000 show a tendency that the viscosity of the prepolymer increases, which causes deterioration in workability in molding a cleaning blade. In addition, among the above polyol, it is prefereble to employ polybutylene adipate, which is superior in hydrolysis resistance rather than polyethylene adipate, because hydrolysis resistance of urethane rubber obtained by employing polyethylene adipate is slightly inferior at its ester joint part.

As preparation for the prepolymer by employing the polyisocyanate and the polyol, there are no limitation specifically. For example, it may be produced as follows. First, the polyisocyanate and the polyol are mixed or compounded. Next, the mixture is reacted at 80° to 120° C. for 30 to 90 minutes so as to obtain a prepolymer. At that time, it is preferable to set an NCO % value calculated from the following expression within a range of 5 to 30% by weight. The prepolymer having such an NCO % value falls in a low viscosity range of 50 to 500 cps at 75° C. Namely, when an NCO % value is less than 5% by weight, the viscosity of the prepolymer does not decrease sufficiently, which causes a fear of difficulty in filling the cavity of the mold therewith. In the meantime, when an NCO % value is over 30% by weight, a curing reaction becomes non-uniform, which causes a problem that the physical properties of thus obtained urethane rubber deteriorate. It is possible to adjust the NCO % value by varying the mixing ratio of polyIsocyanate and polyol. Besides, viscosity mentioned in the present invention means the viscosity measured based on JIS K 7117.

$$NCO\% = \frac{\left(\dfrac{\text{polyisocyanate weight}}{\text{polyisocyanate equivalent}} - \dfrac{\text{polyol weight}}{\text{polyol equivalent}}\right) \times 42.02}{\text{polyisocyanate weight} + \text{polyol weight}} \times 100$$

Then, as the curing agent, it is preferable to employ a low molecular weight polyol having molecular weight of not more than 300. As such polyol, for example, there are ethylene glycol (EG), diethylene glycol (DEG), propylene glycol (PG), dipropylene glycol (DPG), 1,4-butanediol (14 BD), hexanediol (HD), 1,4-cyclohexaniediol, 1,4-cyclohexane dimethanol, xylene glycol (telephthalyl alcohol), triethylene glycol, trimethylolpropane, glycerin, pentaerylthiritol, sotbitol and the like.

From viewpoints of ease of mixing and properties of thus obtained cleaning blade, the preferable combination of the prepolymer and the curing agent is to employ the prepolymer comprising MDI and polyester polyol such as polyethylene adipate, polybutylene adipate, and 1,4-butanediol, trimethylolpropane or their mixture as the curing agent. The most preferable combination is to employ the prepolymer comprising MDI and polybutylene adipate, and the mixture of 1,4-butanediol and trimethylolpropane as the curing agent.

In addition, it is preferable to compound the prepolymer and the curing agent in such a manner that the hardness of the obtained urethane rubber falls within a range of 60 to 80 (JIS A). This is because the obtained cleaning blade within above hardness especially shows superior effects on cleaning.

To accomplish the above hardness, it is preferable to mix 10 to 200 parts by weight (abbreviated to 'parts' hereinafter) of the curing agent based on 100 parts of the prepolymer. Besides, the curing agent is usually mixed with a part of the polyol, and then is to be mixed with the prepolymer liquid when using.

Further, the catalyst employed with the prepolymer and the curing agent in the present invention should be quaternary ammonium salt represented as the following general formula (1).

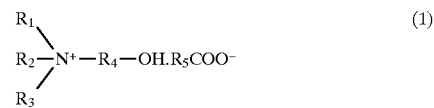

wherein $R_{1,2,3}$ means $—C_nH_{2n+1}$ wherein n represents 0 or a positive integer, $R_4$ means $—C_nH_{2n}$ wherein n represents a positive integer and $R_5$ means $—C_nH_{2n+1}$, wherein n represents 0 or a positive integer, or $—CH_2—CN$.

That is, since the quaternary ammonium salt is higher in heat sensitivity compared with a conventional general catalyst such as TEDA or DMIZ, when being used as a catalyst for the curing reaction of a two-liquid mixture of the prepolymer liquid and the curing agent liquid, it hardly shows its activity until the liquid mixture reaches a certain temperature after the two liquids are mixed, whereby the initial viscosity of the liquid mixture can be maintained at a low level. Therefore, a pot life (or the time until the liquid mixture cures after the two liquids are mixed so that casting becomes impossible) is long, which realizes good workability in casting the liquid without defective products. Besides, the quaternary ammonium salt is higher in its activity than that of a conventional general catalyst, so that the curing reaction progresses rapidly at a time when the liquid mixture reaches a specific temperature than in the case using the conventional one. For this reason, it is possible to shorten the time for the curing reaction after casting.

As the quaternary ammonium salt, for example, there are commercially available products named DABCO TAC (a product of Sankyo Air Products Co., Ltd.), DABCO TMR (a product of Sankyo Air Products Co., Ltd.) and the like. These are usually mixed in the curing agent liquid as same as a general catalyst. In addition, the DABCO TAG and the DABCO TMR are represented as the following general formulae (2) and (3), respectively.

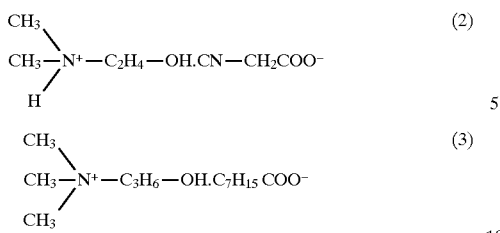

$$CH_3-\underset{\underset{H}{|}}{\overset{\overset{CH_3}{|}}{N^+}}-C_2H_4-OH.CN-CH_2COO^- \quad (2)$$

$$CH_3-\underset{\underset{CH_3}{|}}{\overset{\overset{CH_3}{|}}{N^+}}-C_3H_6-OH.C_7H_{15}COO^- \quad (3)$$

It is preferable to set the mixing amount of the quaternary ammonium salt within a range of 0.002 to 0.03% by weight based on the whole liquid composition after the prepolymer liquid and the curing agent liquid have been mixed. Namely, a content less than 0.002% by weight may cause a low effect on accelerating the curing reaction, which means that it requires more time to complete the curing reaction, resulting in insufficient improvement on product efficiency. In the meantime, a content over 0.03% by weight may cause extreme acceleration on the curing reaction and flow insufficiency in filling the cavity of the mold with the liquid.

In addition, as a catalyst for accelerating the curing reaction in the present invention, a conventional general catalyst (TEDA, DMIZ or the like) may be employed together with the quaternary ammonium salt. In this case, the content of the quaternary ammonium salt and a general catalyst is preferably set within a range of 0.002 to 0.03% by weight based on the whole liquid composition after the two liquids are mixed as same as in the case using only the quaternary ammonium salt.

In the present invention, a cleaning blade is produced by using the above materials and the mold for forming thereof, for example, as follows. First, a holding plate (2 as shown in FIG. 1) is positioned in a specific mold for forming a cleaning blade in accordance with the prior method. In the meantime, the prepolymer liquid and the curing agent liquid containing the above specific catalyst are mixed for preparation of a liquid composition for forming the cleaning blade. Then, the liquid composition is filled into the cavity of the mold, which is to be heated to 60° C. to 150° C. for a curing reaction. Finally, a cleaning blade can be obtained by unmolding the cured matter from the mold.

Since the liquid composition for forming the cleaning blade contains the above specific catalyst, a pot life is long so that it is easy to fill the cavity of the mold therewith, causing no defective products by flow insufficiency. Further, the curing reaction progresses rapidly after the liquid has reached a specific temperature so that it takes a short time of within 10 minutes from casting to unmolding, resulting in improvement in product efficiency by shortening a molding cycle. Still further, this method has the advantage that a large-sized molding as has been difficult to be molded heretofore can be produced well. In addition, the present invention is especially suitable for the case that the liquid composition is prepared by a semi-one shot mixing method for its long pot life of the liquid composition. Among all, the cleaning blade obtained by using polybutylene adipate as polyol has the advantage that sufficient hardness can be retained over a long period for its superiority in hydrolysis resistance.

BRIEF DESCRIPTION OF THE DRAWINGS

FIG. 5 is a chart illustrating secular changes in hardness retention degree of urethane rubber of cleaning blades in EXAMPLES and COMPARATIVE EXAMPLES.

Now, EXAMPLES will be described in detail with reference to COMPARATIVE EXAMPLES.

EXAMPLES 1–7 AND COMPARATIVE EXAMPLES 1–2

Figure 1:
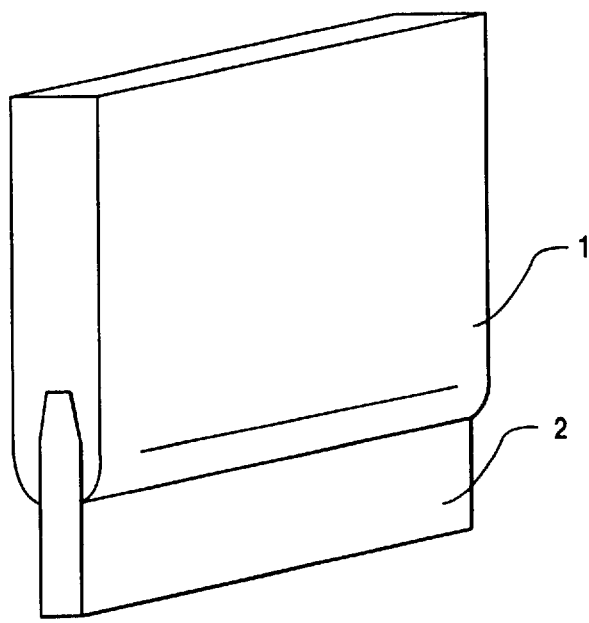
FIG. 1 is a schematic illustration of a cleaning blade.
Figure 2:
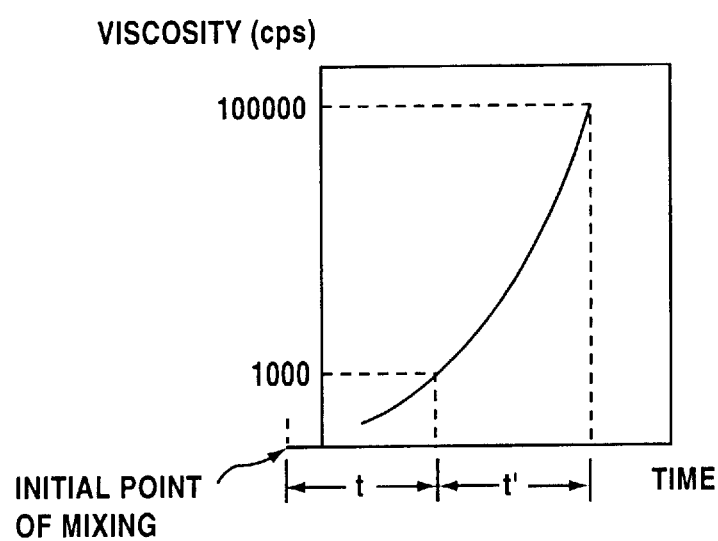
FIG. 2 is a chart for explaining a pot life time and a curing time after the pot life.
Figure 3:
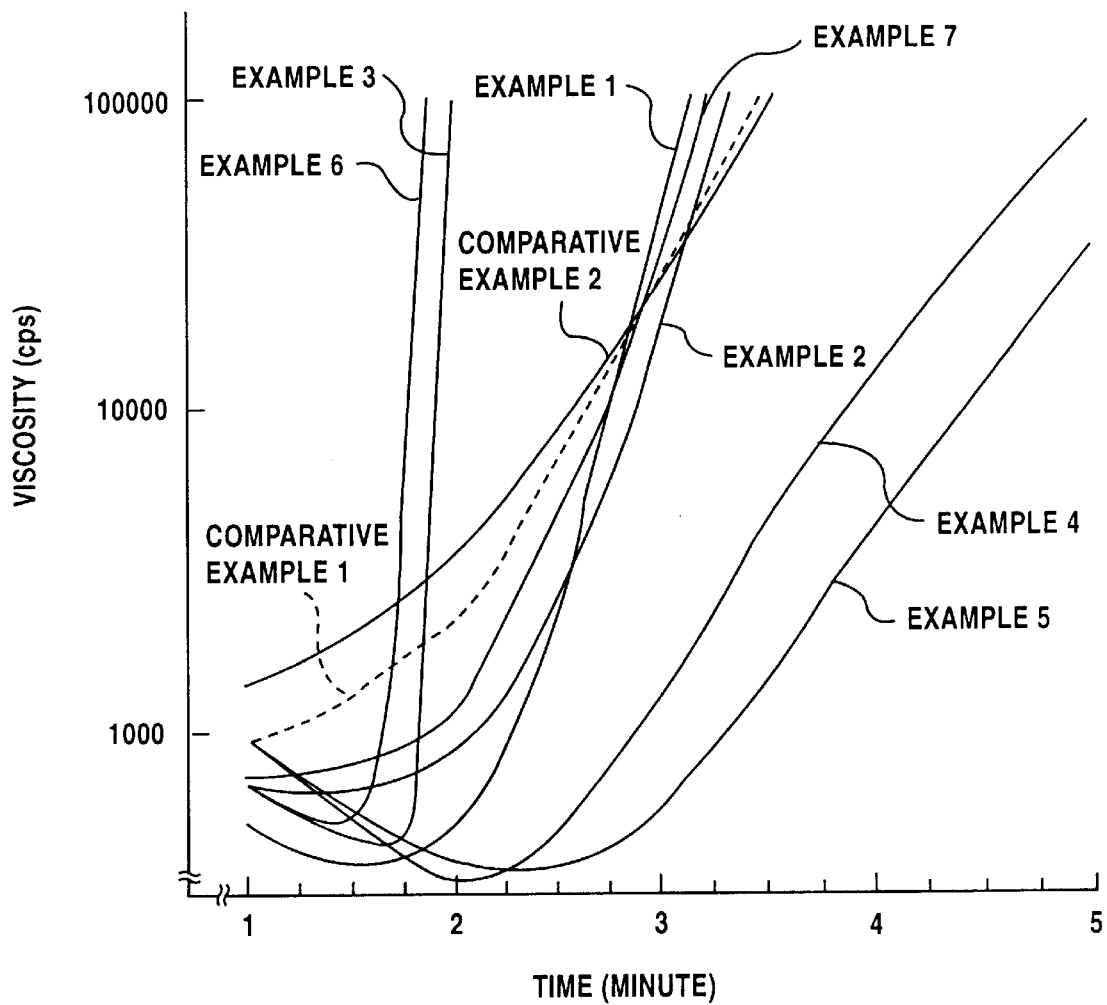
FIG. 3 is a chart illustrating secular changes in viscosity of liquid compositions in EXAMPLES and COMPARATIVE EXAMPLES.

First, a prepolymer liquid (liquid temperature: 70° C.) and a curing agent liquid (liquid temperature: 70° C.), each of which has compositions described in the following TABLES 1 to 3, were prepared. Then, both liquids were mixed in such a manner that an NCO index is 108, and stirred by stirring blades with vacuum defoaming for 30 seconds, and then heated up to 140° C. where secular viscosity changes were measured by a Brookfield type viscometer. The results are shown in FIG. 3. In the meantime, the time from the initial point of mixing to the point where viscosity is 1,000 cps (as shown as t in FIG. 2) is regarded as a pot life time, while the time until the viscosity has reached 100,000 cps (as shown as t' in FIG. 2) after the pot life is regarded as a curing time, whose results are also shown in TABLES 1 to 3. Besides, each of the above liquid compositions was filled into the cavity of a mold for forming the cleaning blade so as to actually produce the cleaning blade. At that time, fluidity of each liquid composition in the mold was evaluated. Those results are also shown in the following TABLES 1 to 3.

TABLE 1

| | (Parts) EXAMPLES | | |
|---|---|---|---|
| | 1 | 2 | 3 |
| Prepolymer: | | | |
| polyisocyanate (MDI) | 58 | 58 | 58 |
| polyol (PEA) | 42 | 42 | 42 |
| NCO % *1 | 17.0 | 17.0 | 17.0 |
| Curing Agent: | | | |
| low molecular weight polyol *2 | 12 | 12 | 12 |
| polyol (PEA) | 88 | 88 | 88 |
| OH value *3 | 210 | 210 | 210 |
| Catalyst: | | | |
| DABCO TAC | 0.01 | 0.01 | 0.06 |
| TEDA | — | 0.01 | — |
| Mixing Ratio of Catalyst *4 | 0.005 | 0.01 *5 | 0.03 |
| Pot Life Time | 2 m 18 s | 2 m 06 s | 1 m 49 s |
| Curing Time after Pot Life | 51 s | 1 m 05 s | 11 s |
| Hardness of Product (JIS A) | 71 | 72 | 71 |
| Fluidity in Mold | ⊚ | ⊚ | ○ |

NB) *1: NCO % by weight of prepolymer
*2: Mixture of 1,4-butanediol (A) and trimethylolpropane (B) [mixture mole ratio: A/B = 60/40]
*3: OH value of polyol components (KOH mg/g)
*4: % by weight based on the whole composition
*5: DABCO TAC 0.005% by weight + TEDA 0.005% by weight

TABLE 2

| | (parts) EXAMPLES | | |
|---|---|---|---|
| | 4 | 5 | 6 |
| Prepolymer: | | | |
| polyisocyanate (MDI) | 58 | 58 | 58 |
| polyol (PEA) | 42 | 42 | 42 |
| NCO % *1 | 17.0 | 17.0 | 17.0 |
| Curing Agent: | | | |
| low molecular weight polyol *2 | 12 | 12 | 12 |
| polyol (PEA) | 88 | 88 | 88 |
| OH value *3 | 210 | 210 | 210 |
| Catalyst: | | | |
| DABCO TAC | 0.004 | 0.003 | 0.064 |
| TEDA | — | — | — |
| Mixing Ratio of Catalyst *4 | 0.002 | 0.0015 | 0.032 |
| Pot Life Time | 2 m 54 s | 3 m 17 s | 1 m 40 s |
| Curing Time after Pot Life | 2 m 12 s | 2 m 15 s | 10 s |
| Hardness of Product (JIS A) | 73 | 73 | 71 |
| Fluidity in Mold | ◎ | ◎ | ○ |

NB) *1: NCO % by weight of prepolymer
*2: Mixture of 1,4-butanediol (A) and trimethylolpropane (B) [mixture mole ratio: A/B = 60/40]
*3: OH value of polyol components (KOH mg/g)
*4: % by weight based on the whole composition

TABLE 3

| | (parts) | | |
|---|---|---|---|
| | EXAMPLE | COMPARATIVE EXAMPLES | |
| | 7 | 1 | 2 |
| Prepolymer: | | | |
| polyisocyanate (MDI) | 58 | 58 | 58 |
| polyol (PEA) | 42 | 42 | 42 |
| NCO % *1 | 17.0 | 17.0 | 17.0 |
| Curing Agent: | | | |
| low molecular weight polyol *2 | 12 | 12 | 12 |
| polyol (PEA) | 88 | 88 | 88 |
| OH value *3 | 210 | 210 | 210 |
| Catalyst: | | | |
| DABCO TAC | 0.008 | — | — |
| TEDA | 0.012 | 0.04 | — |
| 1,2-dimethylimidazole | — | — | 0.07 |
| Mixing Ratio of Catalyst *4 | 0.01 *5 | 0.02 | 0.035 |
| Pot Life Time | 1 m 59 s | 1 m 15 s | 26 s |
| Curing Time after Pot Life | 1 m 13 s | 2 m 15 s | 3 m 07 s |
| Hardness of Product (JIS A) | 71 | 70 | 71 |
| Fluidity in Mold | ○ | Δ | Δ |

NB) *1: NCO % by weight of prepolymer
*2: Mixture of 1,4-butanediol (A) and trimethylolpropane (B) [mixture mole ratio: A/B = 60/40]
*3: OH value of polyol components (KOH mg/g)
*4: % by weight based on the whole composition
*5: DABCO TAC 0.004% by weight + TEDA 0.006% by weight From the results as shown in the above TABLES 1 to 3, it is found that every EXAMPLE has a long pot life and good fluidity but a short curing time after the pot life, resulting in better product efficiency compared with COMPARATIVE EXAMPLES.

EXAMPLES 8–9 AND COMPARATIVE EXAMPLES 3–4

Figure 4:
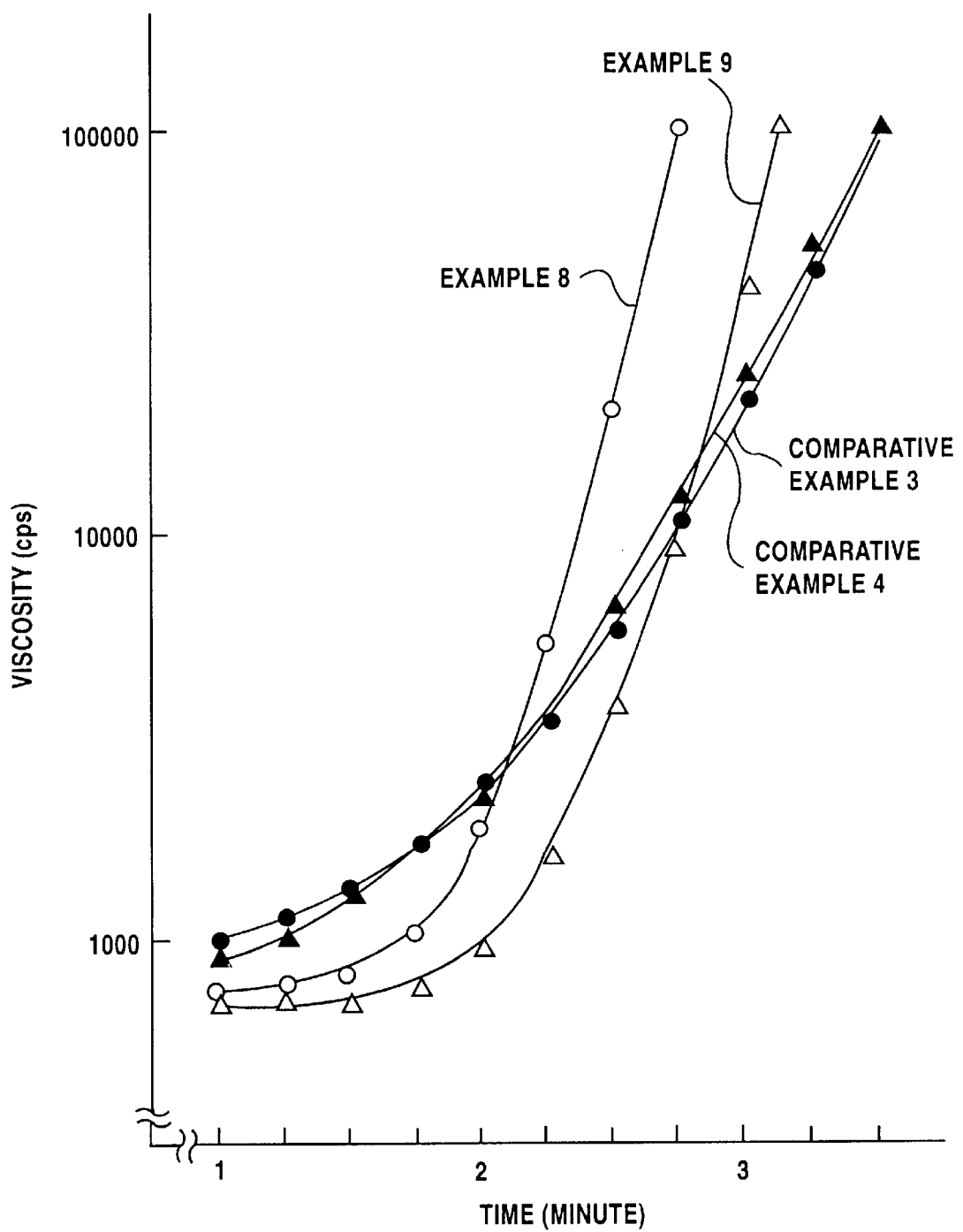
FIG. 4 is a chart illustrating secular changes in viscosity of liquid compositions in EXAMPLES and COMPARATIVE EXAMPLES.

A prepolymer liquid (liquid temperature: 70° C.) and a curing agent liquid (liquid temperature: 70° C.), each which has compositions described in the following TABLES 4 to 5, were prepared. Each secular viscosity change of the liquid compositions was measured in the same way as in the above. The results are shown in FIG. 4. In the meantime, each of the liquid composition was employed so as to produce the cleaning blade in the same way as the above, which was evaluated in the same way as the above. The results are shown in the TABLES 4 to 5. Besides, thus obtained cleaning blade was allowed to stand under a heated humid atmosphere of 80° C.×90% RH and a secular change in hardness retention degree (International Rubber Hardness Degree; IRHD) in urethane rubber was evaluated. The results are shown in the following TABLES 4–5 and also in FIG. 5. In addition, the hardness (IRHD) was measured by Wallace hardness micrometer made by Wallace Company in accordance with JIS K 6253.

TABLE 4

| | (parts) EXAMPLES | |
|---|---|---|
| | 8 | 9 |
| Prepolymer: | | |
| polyisocyanate (MDI) | 58 | 58 |
| polyol (PBA) | 42 | — |
| polyol (PEA) | — | 42 |
| NCO % *1 | 17.0 | 17.0 |
| Curing Agent: | | |
| low molecular weight polyol *2 | 12 | 12 |
| polyol (PBA) | 88 | — |
| polyol (PEA) | — | 88 |
| OH value *3 | 210 | 210 |
| Catalyst: | | |
| DABCO TMR | 0.01 | 0.01 |
| TEDA | 0.01 | 0.01 |
| Mixing Ratio of Catalyst *4 | 0.01 *5 | 0.01 *5 |
| Pot Life Time | 1 m 42 s | 2 m 01 s |
| Curing Time after Pot Life | 1 m 03 s | 1 m 06 s |
| Hardness of Product (JIS A) | 72 | 71 |
| Fluidity in Mold | ◎ | ◎ |
| Initial Hardness (IRHD) | 72.5 | 71.1 |
| Hardness Retention Degree (%) | | |
| 0 day | 100 | 100 |
| 5 days | 99 | 99 |
| 13 days | 97 | 93 |
| 20 days | 93 | 74 |

NB *1: NCO % by weight of prepolymer
*2: Mixture of 1,4-butanediol (A) and trimethylolpropane (B) [mixture mole ratio: A/B = 60/40]
*3: OH value of polyol components (KOH mg/g)
*4: % by weight based on the whole composition
*5: DABCO TMR 0.005% by weight + TEDA 0.005% by weight

TABLE 5

| | (parts) COMPARATIVE EXAMPLES | |
|---|---|---|
| | 3 | 4 |
| Prepolymer: | | |
| polyisocyanate (MDI) | 58 | 58 |
| polyol (PBA) | 42 | — |

TABLE 5-continued

| | (parts) COMPARATIVE EXAMPLES | |
|---|---|---|
| | 3 | 4 |
| polyol (PEA) | — | 42 |
| NCO % *1 | 17.0 | 17.0 |
| Curing Agent: | | |
| low molecular weight polyol *2 | 12 | 12 |
| polyol (PBA) | 88 | — |
| polyol (PEA) | — | 80 |
| OH value *3 | 210 | 210 |
| Catalyst: | | |
| DABCO TMR | — | — |
| TEDA | 0.04 | 0.04 |
| Mixing Ratio of Catalyst *4 | 0.02 | 0.02 |
| Pot Life Time | 1 m 00 s | 1 m 15 s |
| Curing Time after Pot Life | 2 m 30 s | 2 m 15 s |
| Hardness of Product (JIS A) | 72 | 70 |
| Fluidity in Mold | Δ | Δ |
| Initial Hardness (IRHD) | 73.0 | 70.8 |
| Hardness Retention Degree (%) | | |
| 0 day | 100 | 100 |
| 5 days | 97 | 96 |
| 13 days | 89 | 74 |
| 20 days | 81 | 45 |

NB) *1: NCO % by weight of prepolymer
*2: Mixture of 1,4-butanediol (A) and trimethylolpropane (B) [mixture mole ratio: A/B = 60/40]
*3: OH value of polyol components (KOH mg/g)
*4: % by weight based on the whole composition From the results of the above TABLES 4–5, it is found that EXAMPLES 8–9 have the same effects as in EXAMPLES 1–7 and are also superior in hydrolysis resistance so that a constant hardness is retained over a long period. On the other hand, COMPARATIVE EXAMPLE 4 cannot be used as a cleaning blade under a heated humid atmosphere for its inferiority in hydrolysis resistance. In addition, it is found that COMPARATIVE EXAMPLE 3 is superior in hydrolysis resistance but has a short pot life and a long curing time after the pot life, resulting in deterioration in product efficiency.

EFFECTS OF THE INVENTION

As mentioned above, since the present invention employs quaternary ammonium salt as a catalyst, which has not been employed heretofore, in the liquid composition for forming urethane rubber, the pot life of the liquid composition is long and fluidity is sufficient, causing no defective products. Further, since the curing reaction rapidly progresses when the liquid composition reaches a specified temperature, the time required for the curing reaction after casting is short, resulting in significant improvement in product efficiency. Still further, a large-sized molding as has been difficult heretofore can be obtained according to the present invention.

In case that a polymer of polyisocyanate and polybutylene adipate is employed as prepolymer for forming the urethane rubber, hydrolysis resistance of thus obtained cleaning blade is improved so that good performance can be maintained over a long period.

Besides, in case that the quaternary ammonium salt is employed as a catalyst solely or in combination with other catalyst(s), especially superior effects in improving product efficiency can be realized by setting the mixing ratio thereof at 0.002 to 0.03% by weight based on the whole composition.

What is claimed is:

1. A method of producing a cleaning blade comprising steps of providing a mold having a cavity for forming the cleaning blade, filling the cavity of the mold with a liquid composition containing prepolymer for forming urethane rubber, a curing agent and a catalyst, curing the composition, and unmolding the cured composition, wherein the prepolymer for forming the urethane rubber is made by polymerizing polyisocyanate and polybutylene adipate, wherein the curing agent contains low molecular weight polyol and polybutylene adipate, and wherein the catalyst is quaternary ammonium salt represented as the following general formula (1)

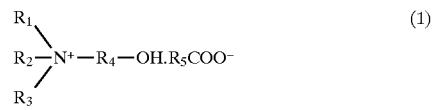

wherein $R_{1,2,3}$ means $-C_nH_{2n+1}$, wherein n represents 0 or a positive integer, $R_4$ means $-C_nH_{2n}$, wherein n represents a positive integer, and $R_5$ means $-C_nH_{2n+1}$ wherein n represents 0 or a positive integer, or $-CH_2-CN$.

2. A method of producing a cleaning blade according to claim 1, wherein the catalyst accounts for 0.002 to 0.03% by weight based on the whole liquid composition.

3. A liquid composition containing prepolymer for forming urethane rubber, a curing agent and a catalyst, wherein the prepolymer for forming urethane rubber is made by polymerizing polyisocyanate and polybutylene adipate, wherein the curing agent contains low molecular weight polyol and polybutylene adipate, wherein the catalyst is quaternary ammonium salt represented as the following general formula (1)

wherein $R_{1,2,3}$ means $-C_nH_{2+1}$, wherein n represents 0 or a positive integer, $R_4$ means $-C_nH_{2n}$ wherein n represents a positive integer, and $R_5$ means $-C_nH_{2+1}$ wherein n represents 0 or a positive integer, or $-CH_2-CN$.

4. A liquid composition according to claim 3 wherein the catalyst accounts for 0.002 to 0.03% by weight based on the whole liquid composition.

* * * * *

UNITED STATES PATENT AND TRADEMARK OFFICE
CERTIFICATE OF CORRECTION

PATENT NO.: 5,866,667
DATED : February 2, 1999
INVENTOR(S): SUZUKI et al.

It is certified that errors appear in the above-identified patent and that said Letters Patent is hereby corrected as shown below:

In claim 3, on line 50 of column 10, change " $-C_nH_{2+1}$" to be -- $-C_nH_{2n+1}$ --

In claim 3, on line 52 of column 10, change " $-C_nH_{2+1}$ " to be -- $-C_nH_{2n+1}$ --

Signed and Sealed this

Seventh Day of March, 2000

Attest:

Attesting Officer

Q. TODD DICKINSON

Commissioner of Patents and Trademarks